United States Patent [19]
Funk et al.

[11] Patent Number: 5,597,397
[45] Date of Patent: Jan. 28, 1997

[54] TRANSFER DEVICE FOR BENT GLASS SHEETS

[75] Inventors: Dieter Funk, Witten; Dieter Bruns, Rheinberg; Rolf Wenning, Bocholt; Walter Brans, Recklinghausen; Joachim Pilz, Gelsenkirchen, all of Germany

[73] Assignee: Flachglas Aktiengesellschaft, Furth, Germany

[21] Appl. No.: 422,499

[22] Filed: Apr. 12, 1995

[30] Foreign Application Priority Data

Apr. 15, 1994 [DE] Germany .................. 44 12 748.0

[51] Int. Cl.$^6$ ............................................... C03B 23/03
[52] U.S. Cl. ........................... 65/171; 65/268; 65/287
[58] Field of Search ........................... 65/27, 104, 106, 65/107, 114, 115, 171, 172, 173, 268, 287, 273, 289, 290, 291

[56] References Cited

U.S. PATENT DOCUMENTS

| | | | |
|---|---|---|---|
| 3,778,224 | 12/1973 | Nedelec et al. | 65/106 |
| 4,285,715 | 8/1981 | Frank | 65/106 |
| 4,406,685 | 9/1983 | Jursa | 65/287 |
| 4,433,993 | 2/1984 | Frank | 65/104 |
| 4,556,401 | 12/1985 | Fecik et al. | 65/289 |
| 4,556,408 | 12/1985 | Fecik et al. | 65/289 |
| 4,812,517 | 3/1989 | Smith | 65/273 |
| 4,842,634 | 6/1989 | Vanaschen et al. | 65/106 |
| 4,892,574 | 6/1990 | Cortes | 65/273 |
| 5,007,949 | 4/1991 | Mathivat et al. | 65/160 |
| 5,090,989 | 2/1992 | Adoline | 65/273 |
| 5,320,661 | 6/1994 | Fecik et al. | 65/104 |
| 5,352,263 | 10/1994 | Kuster et al. | 65/106 |
| 5,472,470 | 12/1995 | Kormanyos et al. | 65/287 |

FOREIGN PATENT DOCUMENTS

90/11973 10/1990 WIPO .

*Primary Examiner*—Donald E. Czaja
*Assistant Examiner*—Sean Vincent
*Attorney, Agent, or Firm*—Herbert Dubno

[57] ABSTRACT

A transfer device for bent glass sheets during the course of automated production of motor vehicle glass windows on a production line with continuous furnace, bending press, toughening station and device for onward conveyance of the toughened glass sheets. The transfer device operates between the bending press and the toughening station. The transfer device is a shuttle transfer device whose shuttle is guided on shuttle guide rails. The shuttle guide rails are supported statically on the one hand on the press frame of the bending press and on the other hand on the station frame of the toughening station as beams on two supports or as continuous beams. The shuttle incorporates a shuttle frame as well as a shuttle ring mounted therein and the shuttle frame is guided on the shuttle guide rails by means of a shuttle frame mounting which movable on the shuttle guide rails. The shuttle ring is adjustable in relation to the shuttle frame mounting and thus in relation to the male bending mold. The shuttle ring incorporates on its edges positioning devices for the glass sheets received. At least the areas of the shuttle guide rails which project into the press frame of the bending press are removable for the purpose of carrying out maintenance and/or repair work on the bending press.

10 Claims, 3 Drawing Sheets

5,597,397

TRANSFER DEVICE FOR BENT GLASS SHEETS

FIELD OF THE INVENTION

Our present invention relates to a transfer device for bent glass sheets or panes in the automated production of motor vehicle windows on a production line with a continuous furnace for heating the glass sheets to be bent to bending temperature, a bending press with a male bending mold and female bending mold in a press frame, where the male bending mold and/or the female bending mold can be raised and lowered, and in which the heated glass sheets are bent successively in a horizontal orientation in accordance with specified nominal geometry, a toughening station for cooling the finish-bent glass sheets, and a device for onward conveyance of the cooled glass sheets, the transfer device operating between the bending press and the toughening station.

BACKGROUND OF THE INVENTION

Production lines of the construction described and functioning as described are known in practice in various configurations. At least the bending press and the toughening station operate cyclically. In modern technology, such production lines must meet a number of basic requirements, that is to say that on the one hand they must operate with high output and thus short cycle times and, on the other hand, they must supply products such as for example bent glass sheets, which maintain close and extreme tolerances with respect to production accuracy. In addition, the apparatus must be able to be set up at short notice and in a simple manner for different bending geometries if different glass sheets have to be bent differently in batches and frequently as well with relatively small batch sizes.

The transfer device of WO 90/11973 is a shuttle transfer device whose shuttle is located in the station frame. For this purpose, mounting cross-beams are provided for the shuttle mounting, and to which the shuttle is attached. The mounting cross-beams are movably supported on cross-beam guides of the station frame and are freely retractable into the press frame of the bending press. This system has proved to be satisfactory, but is capable of improvement if short cycle times, high levels of accuracy in relation to the bent glass sheets are required and in addition it is to be ensured that even with extremely short cycle times, deformation faults caused by vibration and resulting from high forces from positive or negative acceleration are not imparted to the glass sheets.

OBJECTS OF THE INVENTION

It is the principal object of the invention to provide an improved transfer device for the purposes described such that even with extremely short cycle times, glass sheets are produced with a high degree of precision and free from faults.

Another object is to provide an improved transfer device which is readily and quickly resettable for the manufacture of different products.

Another object is to provide an improved transfer device for bent glass sheets, between a press and a toughening or tempering or annealing station of a glass bending line, which is free from the drawbacks of earlier transfer devices.

SUMMARY OF THE INVENTION

These objects are attained, in accordance with the invention, in a transfer device, where:

- the transfer device operates between the bending press and toughening station;
- the transfer device is a shuttle transfer device whose shuttle is guided on its sides facing in a direction of travel on shuttle guide rails;
- the shuttle guide rails are supported statically on the press frame of the bending press and on the station frame of the toughening station as beams on two supports or as continuous beams;
- the shuttle incorporates a shuttle frame as well as a shuttle ring mounted therein and the shuttle frame is guided on the shuttle guide rails by means of a shuttle frame mounting;
- the shuttle ring is adjustable in relation to the shuttle frame mounting and thus in relation to the male bending mold; and
- the shuttle ring incorporates at its edges positioning devices for the accepted glass sheets.

At least the areas of the shuttle guide rails which project into the press frame of the bending press are removable for the purpose of carrying out maintenance and/or retooling work on the bending press.

The invention is based on the principle that with a transfer device which incorporates mounting cross-beams for the shuttle projecting into the press frame and moved in the manner described, undesirable vibrations are unavoidable when it is necessary to operate with high cycle times. Such vibrations do not occur if additional shuttle guide rails are used which are statically arranged as beams on two supports or as continuous beams.

In addition however exact positioning of the shuttle ring in relation to the male bending mold must be ensured and there must be further measures which neutralize the acceleration forces which act on the still soft, bent glass sheets accepted by the shuttle. All of this results from the combination of features described.

Matching to different operating conditions is also possible without difficulty because at least the areas of the shuttle guide rail which project into the press frame of the bending press are removable from the bending press for the purpose of carrying out maintenance and retooling operations. As a result, bent glass sheets are produced which comply with the specified geometry within very close tolerances and do not incorporate faults resulting from acceleration forces or vibration.

Advantageously, the male bending mold incorporates a vacuum locating device for retaining and locating a glass sheet for transfer to the shuttle.

For matching to different operating conditions, for example for matching to female bending molds of differing geometry, the shuttle guide rails can be supported on the press frame as well as on the station frame so as to be vertically adjustable and are there adjustable for different male bending molds and differently equipped male bending molds.

The shuttle frame mounting can be configured in various ways. It consists preferably of mounting cross-beams traversable or movable along the shuttle guide rails. The shuttle ring is advantageously attached to the shuttle frame with mounting brackets. In this respect, it is also possible to realize degrees of freedom of adjustment. To equip the shuttle frame and thus the shuttle ring, it is sufficient in the simplest instance for the shuttle frame to be attached to the shuttle frame mounting in the direction of travel, on the one hand rigidly and on the other hand adjustably. This can be done for example with adjustable screw fastenings. The positioning devices preferably taking the form of positioning clamping devices do not according to experience lead to undesirable marks on the still soft glass sheets if they act on the cut edge faces of the bent glass sheets. For this purpose, the positioning clamping devices can incorporate rotary cylinders and clamping levers or clamping cams which act against the cut edge faces of the glass sheets.

In the case of the transfer device according to the invention, the shuttle guide rails can take the form of rigid rails and can be extendable horizontally from the press frame and also retractable again into the press frame. This extension and retraction is realized if the bending press has to be retooled for any reason, for example for the purpose of changing the male bending mold and female bending mold. For this purpose, it is also possible for the shuttle guide rails to incorporate a folding joint and the areas of shuttle guide rails projecting into the press frame can be folded out of it. The shuttle ring can be a rigid component. This means that in the event of modifications of the bending geometry, the shuttle ring will have to be changed. In the case of the embodiment according to the invention, this is possible without difficulty.

If a transfer device according to the invention is installed and integrated in the automated production of motor vehicle glass windows in a production line, control of the various components of the transfer device according to the invention is effected with the equipment of modern drive and control engineering without difficulty, particularly with computer control of the entire production line.

BRIEF DESCRIPTION OF THE DRAWING

The above and other objects, features and advantages of the present invention will become more readily apparent from the following description, reference being made to the accompanying drawing in which.

SPECIFIC DESCRIPTION

The transfer device I for bent glass sheets illustrated in the figures is intended for automated production of motor vehicle glass windows. The production line as a whole has not been illustrated but the furnace for heating the glass sheets to bending temperature has been shown at 100 in FIG. 1.

Reference may be had to Wo 90/11973 showing details of the production line with which the transfer device is used.

Figure 1:
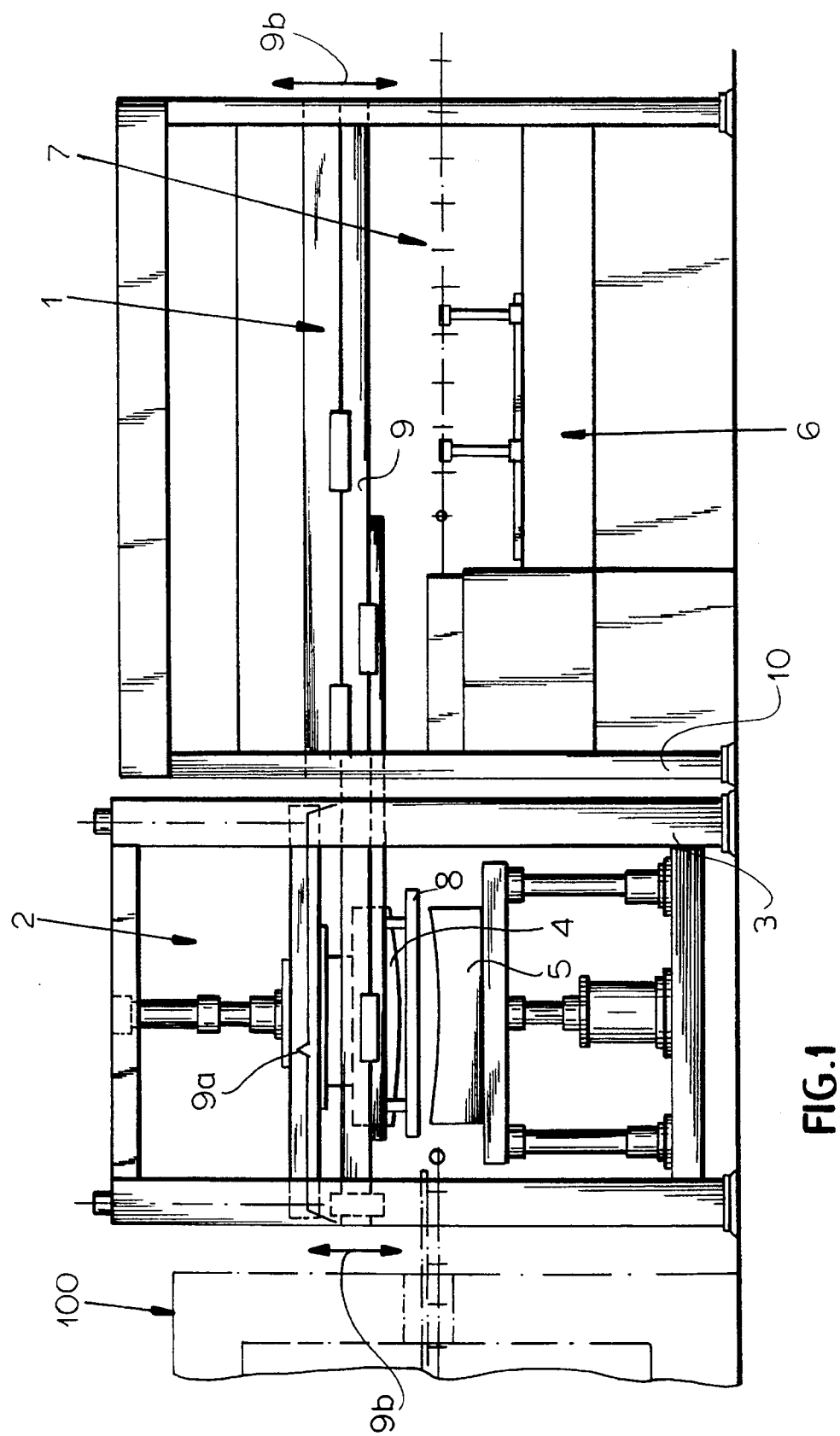
FIG. 1 is a side elevational view of a transfer device according to the invention.

In FIG. 1 one can recognize the bending press 2 with the press frame 3, raisable and lowerable male bending mold 4 and raisable and lowerable female bending mold 5. In this bending press 2, the glass sheets previously heated in the continuous furnace are bent successively in a horizontal position to a predetermined nominal geometry. On the right is adjoined a toughening or tempering station 6 for prestressing and cooling the finish-bent glass sheets, which in turn can be displaced on a device 7 (e.g. a roller conveyor) for onward conveyance of the toughened glass sheets. The transfer device 1 operates between the bending press 2 and the toughening station 6.

The transfer device i is a shuttle transfer device whose shuttle 8 is guided along its sides in a direction of conveyance (to the right in FIG. 1) along shuttle guide rails 9. The shuttle guide rails 9 are supported on the one hand on the press frame 3 of the bending press 2, and on the other hand on the station frame 10 statically as beams on two supports (i.e. beams supported by the left hand member of frame 10 and the right hand member of frame 3) or as a continuous beams (i.e. continuous beams running from the left hand member of frame 3 to the right hand member of frame 10).

Figure 2:
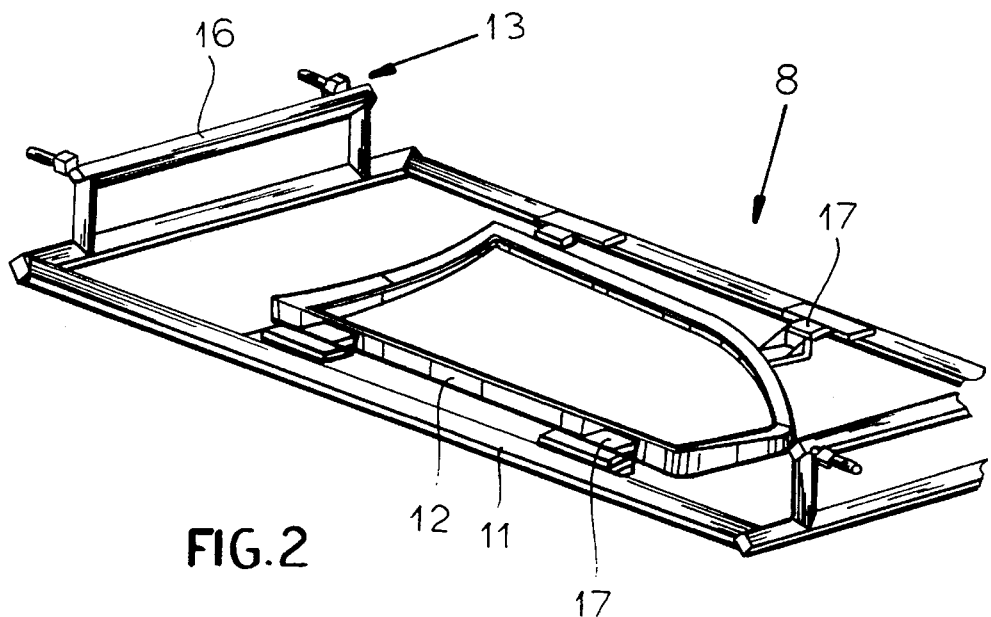
FIG. 2 is a perspective view on a significantly larger scale than FIG. 1 of the shuttle frame with shuttle ring from the FIG. 1.
Figure 3:
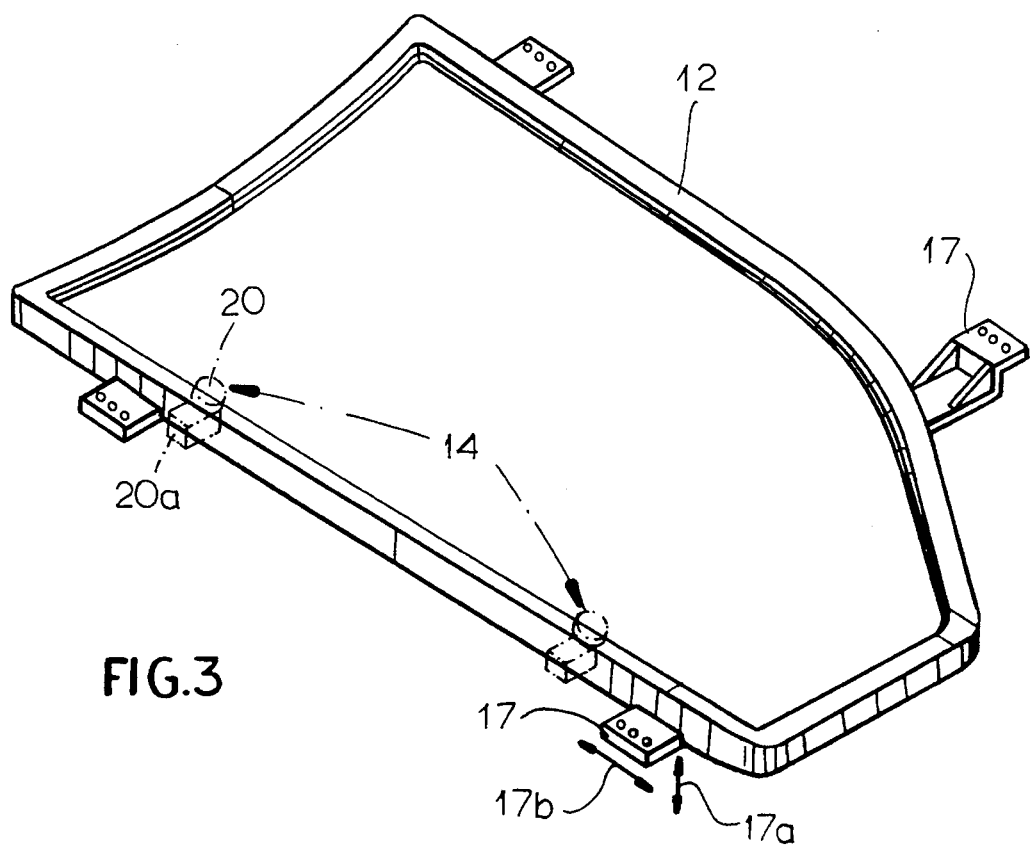
FIG. 3 is a perspective view on a larger scale than FIG. 2 of the shuttle ring.

From FIGS. 2 and 3, it can be seen that the shuttle 8 incorporates a shuttle frame 11 and a shuttle ring 12 supported in it. The shuttle frame 11 is guided by means of a shuttle frame or carriage 13 traversable along the shuttle guide rails 9. The shuttle ring 12 is adjustable in relation to the shuttle frame mounting 13 on member 11 and thus in relation to the male bending mold 4. The shuttle ring 12 incorporates at its edges automatically operable positioning clamping devices 14 for the accepted glass sheets. At least the areas 9a of the shuttle guide rails 9 which project into the press frame 3 of the bending press 2 are removable for the purpose of carrying out maintenance and/or retooling operations on the bending press 2.

In FIG. 1, arrows 9b indicate that the shuttle guide rails 9 are supported on the press frame 3 as well as on the station frame 10 so as to be vertically adjustable. They are thus adjustable for different female bending molds 5 and variously installed male bending molds 4. In the example and according to a preferred embodiment of the invention, the shuttle frame mounting 13 is constructed from the mounting cross-beams 16 traversable along the shuttle guide rails 9. By "traversable" is meant an embodiment where rollers are not used, but slide-like traversing takes place.

From FIGS. 2 and 3 it can also be seen that the shuttle ring 12 is attached with mounting brackets 17 to the shuttle frame 11. These mounting brackets 17 for their part are adjustable as represented by the arrows 17a and 17b.

The shuttle frame 11 is fixed on one side and on the other side adjustably attached to the shuttle frame mountings 13. Adjustment can be effected by means of corresponding positioning gear units, cams or the like.

Figure 4:
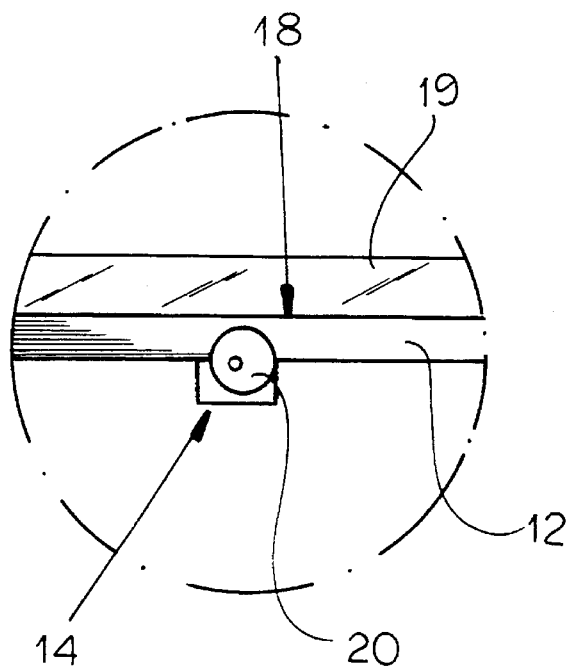
FIG. 4 is a plan view of a detail of a positioning and clamping device on the shuttle ring of FIG. 3.
Figure 5:
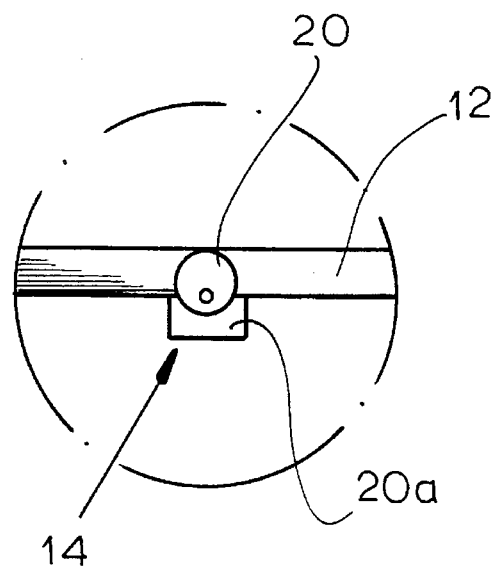
FIG. 5 is a view similar to FIG. 4 in a different functional position.

From FIGS. 3 to 5, it can be seen that the positioning clamping devices 14 act on the cut edge faces 18 of the glass sheets 19. In the example, the positioning clamping devices are rotary cylinders with clamping levers or cams 20. Of course, they can be operated by remote control via the servomotors 20a.

FIG. 1 indicates that the shuttle guide rails 9 take the form of rigid rails. They are retractable and extendable horizontally into the press frame 3 and as illustrated can be supported in the station frame 10. The shuttle guide rails 9 can also however incorporate a folding joint and areas of the shuttle guide rails projecting into the press frame 3 could be folded out of the press frame 3. The shuttle ring 12 takes the form of a rigid component; it must be changed when bending of different glass sheets is involved which are to be bent in accordance with different nominal geometry. Alignment and adjustment of the shuttle ring 12, matching it to the male bending mold 4, can be carried out simply and with great accuracy with the use of an auxiliary device.

We claim:

1. In a production line for production of bent glass sheets comprising:

a continuous furnace for heating glass sheets to be bent to bending temperature;

a bending press with a male bending mold and a female bending mold installed on a press frame, at least one of the male bending mold and the female bending mold being raisable and lowerable for bending heated glass sheets successively in a horizontal orientation;

a toughening station for cooling bent glass sheets;

a device for onward conveyance of the cooled glass sheets downstream of said toughening station; and a transfer device operating between said bending press and said toughening station, the improvement wherein:

(a) the transfer device comprises a shuttle guided on sides facing in a direction of travel on shuttle guide rails extending in said direction, (b) the shuttle guide rails are supported statically on the press frame of the bending press and on a station frame of the toughening station as respective beams, (c) the shuttle comprises a shuttle frame as well as a shuttle ring mounted therein and the shuttle frame is guided on the shuttle guide rails by means of a shuttle frame mounting, (d) the shuttle ring is adjustable in relation to the shuttle frame mounting and thus in relation to the male bending mold, (e) the shuttle ring incorporates at its edges positioning devices for engaging and retaining respective glass sheets, (f) means are provided whereby at least the areas of the shuttle guide rails which project into the press frame of the bending press are removable for the purpose of carrying out maintenance and retooling work on the bending press, and (g) means for mounting said shuttle frame rigidly but adjustably to the shuttle frame mounting.

2. The improvement defined in claim 1 wherein the shuttle guide rails are supported on the press frame as well as on the station frame so as to be vertically adjustable.

3. The improvement defined in claim 1 wherein the shuttle frame has a mounting constructed of mounting cross-beams movable on the shuttle guide rails.

4. The improvement defined in claim 1 wherein the shuttle ring is attached to the shuttle frame with mounting brackets.

5. The improvement defined in claim 1 wherein the positioning devices are automatically operated positioning clamping devices which act on cut edge faces of the glass sheets.

6. The improvement defined in claim 5 wherein the positioning clamping devices incorporate rotary cylinders and clamping levers or clamping cams.

7. The improvement defined in claim 1 wherein the shuttle guide rails are rigid rails and are horizontally extendable from the press frame and retractable into it.

8. The improvement defined in claim 1 wherein the shuttle ring is a rigid component.

9. The improvement defined in claim 1 wherein said rails are beams supported intermediate opposite ends thereof upon two supports.

10. The improvement defined in claim 1 wherein said rails are beams extending continuously from an upstream side of said bending press to a downstream side of said station, said beams being supported only at opposite ends thereof.

* * * * *